US 9,948,119 B2

(12) United States Patent
McMorrow et al.

(10) Patent No.: US 9,948,119 B2
(45) Date of Patent: Apr. 17, 2018

(54) CONTROL OF PARALLEL BATTERY UTILIZATION

(71) Applicant: Inventus Holdings, LLC, June Beach, FL (US)

(72) Inventors: Ryan McMorrow, Jupiter, FL (US); Matthew T. Smith, North Palm Beach, FL (US); Rachana Vidhi, Palm Beach Gardens, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 61 days.

(21) Appl. No.: 15/147,654

(22) Filed: May 5, 2016

(65) Prior Publication Data
US 2017/0324256 A1    Nov. 9, 2017

(51) Int. Cl.
*H02J 7/00* (2006.01)
*B60L 11/18* (2006.01)

(52) U.S. Cl.
CPC ......... *H02J 7/0024* (2013.01); *B60L 11/1864* (2013.01); *H02J 7/0021* (2013.01)

(58) Field of Classification Search
CPC .............................. H02J 7/0021; H02J 7/0024
USPC .................................................. 307/9.1, 10.7
See application file for complete search history.

(56) References Cited

U.S. PATENT DOCUMENTS

| 9,136,705 | B2 | 9/2015 | Namou et al. |
| 9,153,974 | B2 | 10/2015 | Reynolds et al. |
| 9,236,638 | B2 | 1/2016 | Jung |
| 2010/0250162 | A1 | 9/2010 | White et al. |
| 2010/0253277 | A1 | 10/2010 | Chanson et al. |
| 2011/0074354 | A1* | 3/2011 | Yano ................... H01M 10/441 320/116 |
| 2013/0090900 | A1 | 4/2013 | Gering |
| 2015/0256003 | A1 | 9/2015 | Yonetani |

FOREIGN PATENT DOCUMENTS

WO    2015051021 A1    4/2015

OTHER PUBLICATIONS

PCT International Search Report dated Aug. 7, 2017 issued for PCT Application No. PCT/US17/30887.
PCT Written Opinion dated Aug. 7, 2017 issued for PCT Application No. PCT/US17/30887.

* cited by examiner

*Primary Examiner* — John Poos
(74) *Attorney, Agent, or Firm* — Jeffrey N. Giunta; Fleit Gibbons Gutman Bongini & Bianco P.L.

(57) ABSTRACT

Systems and methods for allocating electrical current among battery sets connected in a substantially parallel configuration. A respective state of health is determined for each respective battery set in a plurality of battery sets. The respective state of health reflects a respective present amount of total energy able to be stored by each respective battery set relative to a specification of the respective battery set. A respective allocation of electrical current for each battery set in the plurality of battery sets is determined based on the respective state of health for each respective battery set. A current flow through each respective battery set is configured to its respective allocation of electrical current based on determining the respective allocation.

36 Claims, 6 Drawing Sheets

CONTROL OF PARALLEL BATTERY UTILIZATION

FIELD OF THE DISCLOSURE

The present disclosure generally relates to controlling utilization of auxiliary energy storage devices, and more particularly to controlling the utilization of multiple batteries.

BACKGROUND

In electrical power systems, managing and balancing power consumption at a point in the system is able to use large rechargeable battery systems to store and later provide electrical energy. These batteries are able to be selected to provide electric power to the grid or a particular load or premises on the grid based upon a number of factors such as power demand and load management factors. The rechargeable battery system includes inverters and a control system for coupling the batteries to the grid and for controlling the charging and discharging cycles of the batteries.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
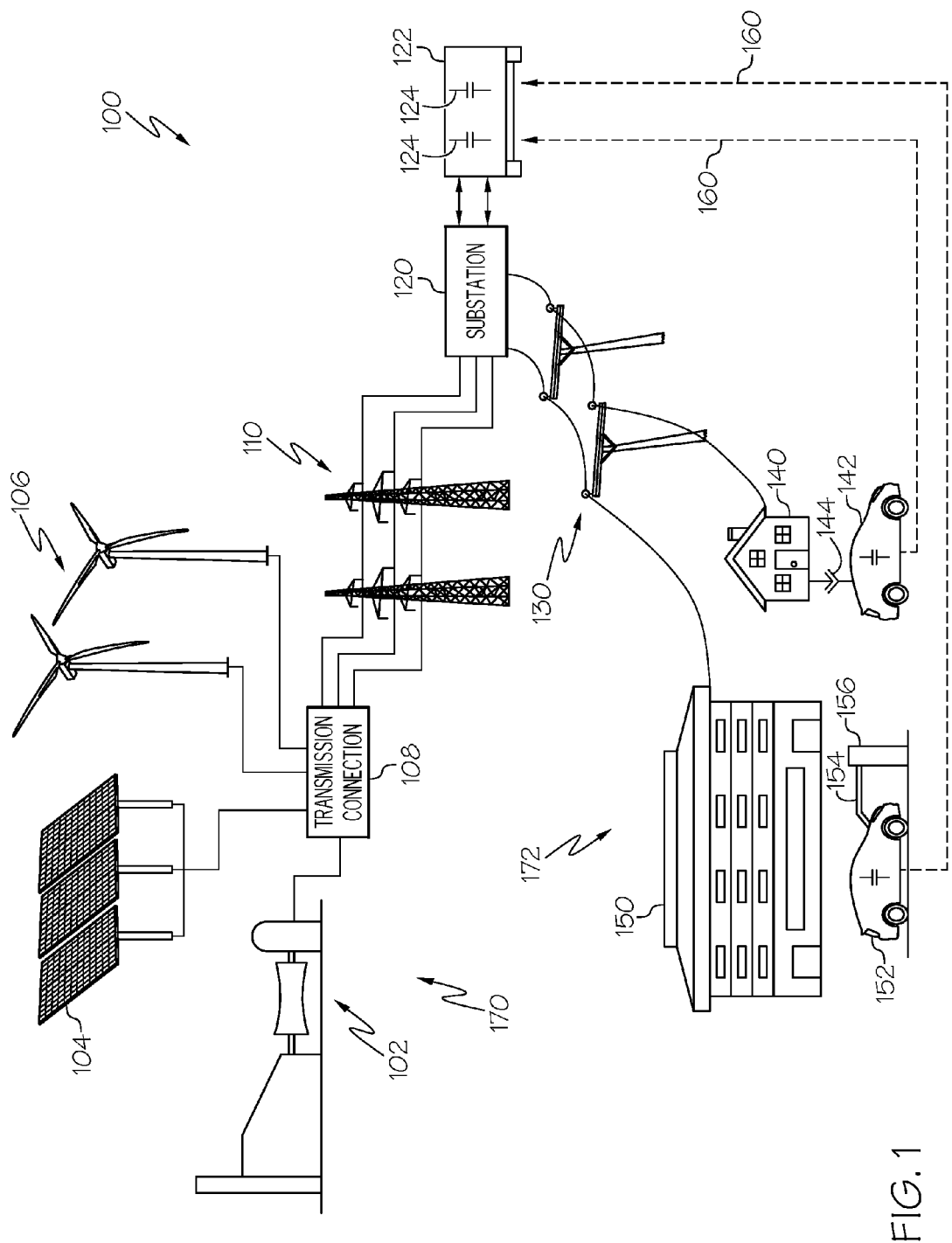
FIG. 1 illustrates an example operational context for the systems and methods described herein.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods control and manage rechargeable battery systems that are used as auxiliary energy sources in electrical power systems. In general, these systems and methods operate to manage a number of batteries or battery sets that are each able to be individually controlled or operated such that each battery or battery set provides or accepts a determined amount of electrical energy and all batteries or battery sets in some examples are able to be combined in parallel to appear to operate as a single battery.

The below descriptions described the operation of various examples that control rechargeable battery systems that store and retrieve energy in the form of electrical energy in one or more batteries. The below described systems and method are also able to be used in conjunction with any energy storing device, such as other types of electrical energy storage devices. Further, it is clear that these examples are able to operate with energy storage devices that are able to store energy for any amount of time.

In electrical power systems, energy storage systems are able to be large rechargeable battery systems that are able to be placed in desired locations in the electrical power distribution system. These rechargeable battery systems are able to receive and store, and then later provide, electrical energy in order to manage and balance power consumption at those locations. These rechargeable battery systems are able to be controlled so as to provide electric power to the grid or to a particular load or premises on the grid based upon a number of factors such as power demand and load management factors. The rechargeable battery systems in some examples also include inverters and control systems for coupling the batteries to the grid and for controlling the charging and discharging cycles of the batteries. A cycle of providing electrical energy to a battery in order to charge that battery, and then drawing electrical energy from the battery to discharge the battery is referred to herein as a "duty cycle."

A large rechargeable battery system is able to be made up of a battery combination that has two or more battery sets. In an example, a battery set includes a configuration of one or more batteries that are connected together and that are operated in some respects as a single battery. A particular battery set is able to have only one battery, or a battery set is able to have any number of batteries that are connected in any suitable arrangement to provide electrical power. A number of battery sets are able to be connected together with each other so that an increased amount of electrical energy is available. In an example, a battery combination is able to include a number of battery sets that are configured to produce similar output voltages where all of the battery sets are connected in a substantially parallel arrangement so that each battery set receives or provides a portion of the electrical current received or provided by the battery combination.

In the following discussion, the term battery capacity refers to a maximum amount of electrical energy that a particular battery is able to store when it is fully charged. The battery capacity of a particular battery degrades with usage and time. The percentage of degradation is referred to a battery's "state of health" or SOH. As a battery is charged and discharged and generally ages, its capacity will continually decrease. As a rechargeable battery is used, its capacity decreases due to this degradation. Particular applications for rechargeable batteries may define a minimum battery capacity and when the battery degrades to the point that its capacity is below this minimum level, that battery is no longer suitable for use in that application. When a particular battery has degraded to the point that its capacity is equal to that minimum battery capacity for its application, the battery is said to have reached its "end-of-useful-life state of health."

In a rechargeable battery system that has multiple battery sets, it is often desirable for all batteries in the rechargeable battery system to reach their end-of-useful-life state of health at about the same time so that all batteries in the system may be simultaneously replaced. If all batteries in a system start at an equal state of health (e.g. 100% capacity), and the batteries are equally charged and discharged, they will in general inherently reach their end-of-useful-life state of health at about the same time.

In some applications, it is desirable to build a rechargeable battery system with a battery combination made up of batteries that are not all at equal states of health. For example, vehicle batteries from electrically powered vehicles such as electric or hybrid cars or other vehicles may reach a depletion level making them unacceptable for application in electric cars. In an example, such batteries are said to have reached their "end of useful life for a vehicle application" state of health. Although operational considerations may decide that these batteries are no longer suitable for a vehicle application, such batteries with that state of health may be suitable for use in rechargeable battery system to be used in other applications, such as in a power grid load management application. In an example, these batteries are able to be repurposed for inclusion in such as rechargeable battery system that is used in a power grid load management application.

A battery that has been used in one application is able to be physically removed from that application and become a repurposed battery that is assembled into a battery combination within a rechargeable battery system. In an example, a battery used to power an electrically powered vehicle, which is an application that is different from exchanging electrical current with an electrical power grid. Such a battery is able to be removed from the electrically powered vehicle and repurposed to become a repurposed battery that is used to store energy and exchange electrical current with an electrical power grid.

In general, a battery combination is able to be assembled using a number of battery sets where some of the battery sets have all new batteries, and other battery sets have repurposed batteries that have some degradation in their state of health. In some of these examples, the repurposed batteries have reduced battery capacities at the time that the battery combination is assembled and the rechargeable battery system with that battery combination is put into service. For various reasons, the states of health of each battery set that includes such repurposed batteries is able to vary significantly from one another when these battery sets are first assembled into one battery combination.

The below described systems and methods operate to more effectively manage a rechargeable battery system containing a battery combination that is assembled from a number of battery sets where the different battery sets in the battery combination are able to have a different state of health when the rechargeable battery system with that battery combination is assembled and put into service. In an example, the charging and discharging cycle for each battery set in the rechargeable battery system is independently managed. The amount of energy exchanged with each battery set in some examples is individually varied based on the present state of heath, or the present capacity, of that battery set. The amount of energy exchanged with a battery set includes the amount of electrical current provided to charge the battery set and the amount of electrical current drawn from the battery set.

The amount of energy exchanged with a particular battery set in an example is based on the state of health of that battery set relative to the other battery sets in the rechargeable battery system. In an example, the amount of energy exchanged with each battery set in the rechargeable battery system is controlled over all charging and discharging cycles with the goal of causing all battery sets in the rechargeable battery system to substantially reach end-of-useful-life state of health at about the same time. Because all battery sets in the rechargeable battery system are operated in a manner that causes all battery sets to reach their end-of-useful-live state of health at about the same time, all batteries in the rechargeable battery system are able to be replaced together.

In an example, a controller causes battery sets with higher states of health to have more intense charge and discharge duty cycles than battery sets with lower states of health. In various examples, more intense charge and discharge duty cycles are able to include charging and discharging the battery set more often, at greater magnitudes, using the battery set in more intense manners, or combinations of these.

In an example, the state of health of each battery set is determined and monitored at various times. In an example, the state of health of each battery set is determined and updated by processing during operation of the rechargeable battery system. In general, battery sets with any state of health can be accommodated when assembling those battery sets into a rechargeable battery system. The determined present state of health for each battery set is used in an example during the operation of a rechargeable battery system to determine the charge and discharge duty cycle to use for each battery set relative to the charge and discharge duty cycle of other battery sets in the rechargeable battery system. In an example, a controller tracks the state of health of each battery set as the battery sets cycle through their charge and discharge duty cycles. The determining and monitoring of the state of health of each battery set may be through any approach. In an example, the below described examples provide for a uniform depletion of battery sets that each have variable states of health at the time of their installation into their rechargeable battery system.

In an example, the battery combination within a rechargeable battery system is able to be assembled with batteries, battery sets, or combinations of these that have different states of health at the time the rechargeable battery system is assembled. For example, a battery combination is able to be assembled with at least a first battery set, which has a first state of health, and a second battery set, which has a second state of health that is different from the first state of health. In such an example this state of health at the time of assembly is considered in determining a respective duty cycle for each of these battery sets when operating the rechargeable battery system.

FIG. 1 illustrates an example operational context 100 for the systems and methods described herein. The example operation context 100 is an example of an electrical power "grid" that is used to provide electrical power to consumer premises 172. The below described systems and methods include storage subsystems, such as the illustrated energy storage system 122, that is able to be deployed to various locations within the electrical power grid. In various examples, these energy storage subsystems are or include rechargeable battery systems that are able to be deployed at various points within an electrical power transmission or distribution system. These energy storage systems 122 are able to, for example, support load management or other operational goals. The example operational context 100 depicts an energy storage system 122 that is deployed to, and operates in conjunction with, a substation 120 in an electrical power grid.

The example operational context 100 depicts a number of example power generation components 170. Illustrated are a combined cycle gas generator 102, a solar array farm 104, and a wind farm 106. In further examples, operational contexts are able to include one power generation component, multiple collocated power generation components, power generation components that are physically separated and supply a common electrical power transmission or distribution system, any one or more power generation components, or combinations of these. These power generation components are able to be of any suitable type or design.

In the example operational context 100, electrical power generated by one or more power generation components is provided to a power transmission system 110. The illustrated example operational context 100 depicts a transmission connection 108 that couples one or more sources within power generation components 170 to the power transmission system 110. The transmission connection 108 and power transmission system 110 in an example include suitable step-up transformers and long distance transmission lines to convey the generated electrical power to remote power distribution networks, other electrical power consumers, or both.

The illustrated power transmission system 110 provides electrical power to a substation 120. The substation 120 includes transformers, protection devices, and other components to provide electrical power to a power distribution system 130.

In the example operational context 100, the substation 120 further includes an energy storage system 122 that receives electrical energy from the substation in this example, stores that energy, and then provides the stored energy to the substation for delivery to the power distribution system 130. In an example, the energy storage system 122 is able to be controlled to, at different times, either selectively receive and store electrical energy, or to provide stored electrical energy. Determining whether and how much electrical energy the energy storage system 122 is to receive or provide, or whether the energy storage system is not to exchange any electrical current, is able to be controlled according to the operation needs such as supporting present power demands, supporting load management functions, or based on other considerations.

The energy storage system 122 in an example is a rechargeable battery system that is assembled from a number of batteries or battery sets 124. The energy storage system 122 stores electric energy received from the transmission system 110 and provides electric energy to a power distribution system 130. The energy storage system 122 may include a plurality of batteries or battery sets 124 that are assembled into an enclosure, such as a metal shipping container, for easy transportation and installation at a substation or other location.

An electrical power grid in general operates to deliver power produced by the generating components 170 to customer premises, such as the illustrated home 140 or office building 150. In general customer premises are coupled to the power distribution system 130 and are able to include any combination of residential, commercial or industrial buildings.

A first vehicle 142 and a second vehicle 152 are examples of electrically powered vehicles. In an example, the first vehicle 142 or the second vehicle 152 are able to be electric or hybrid vehicles that each have batteries and may be used to commute between customer premises or any other location. These electric or hybrid vehicles may further couple to the premises to through connectors 144, 154 to recharge their batteries for use in powering these electrical vehicles.

The battery in these electric or hybrid vehicles degrade over time and usage. The reduced total energy storage capacity of these degraded batteries directly reduces the usable range of the vehicle. It is generally desired to replace the batteries in an electric or hybrid vehicle when they degrade to a point that reduces the vehicle's usable range to below an acceptable threshold. This point is referred to as an end of useful life for the battery in a vehicle application.

Although it may be desirable to replace batteries in an electric or hybrid vehicle when they reach a certain state of health, these degraded batteries may have considerable usefulness when repurposed for use in an energy storage system 122 within an electrical power grid. In an example, degraded batteries from an electric or hybrid vehicles are able to be removed and installed 160 into the energy storage system 122. Batteries installed in an energy storage system 122 for use in an electrical power grid may be repurposed from any of a number of applications, such as batteries from electric or hybrid vehicle applications. In addition to repurposed batteries, some electrical storage systems may be assembled with some new batteries in addition to repurposed batteries.

Partially degraded batteries that are repurposed and installed 160 in an energy storage system 122, however, will have varying states of health due use the degradation incurred by these repurposed batteries during their prior applications. In order to improve the utility of an energy storage system 122 that is assembled with a number of repurposed batteries that may have different states of health, the utilization of each battery or each set of batteries in the energy storage system is able to be individually managed so as to cause all of the batteries in the energy storage system 122 to reach their end of useful life for an electrical power grid application at about the same time. Such management will vary the amount of utilization of each of the component batteries or battery sets based on the present state of health of the particular battery or battery set. Managing each battery or battery set in the energy storage system 122 in such a manner allows all batteries in the energy storage system 122 to reach their individual end of useful life for an electrical power grid application at the same time. Such management of the operation the energy storage system 122 increases the efficiency and cost effectiveness of replacing or rebuilding the energy storage system 122 because such replacement or rebuilding is performed when all of the batteries or battery sets within the energy storage system have reached their end of useful life.

Figure 2:
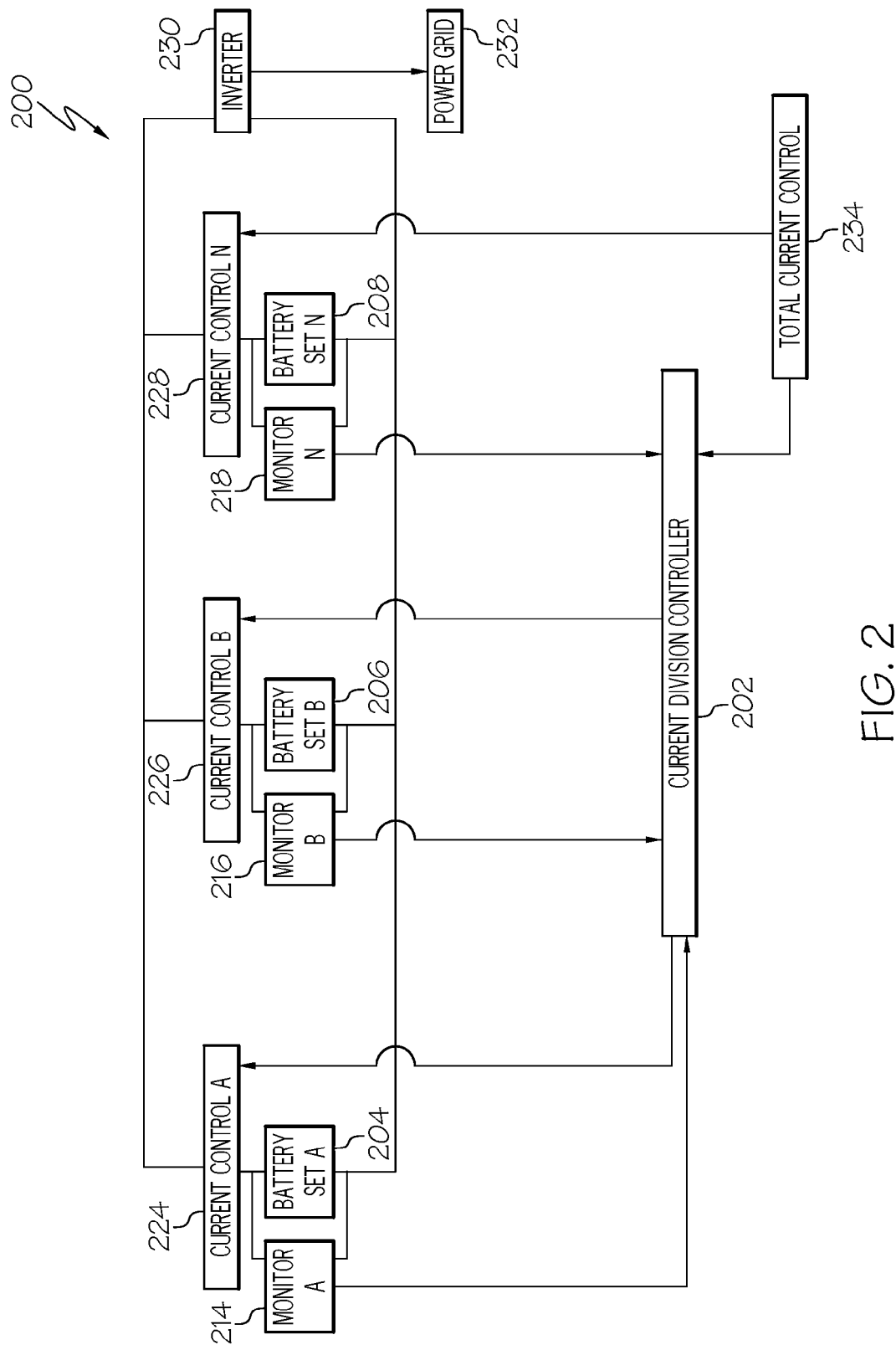
FIG. 2 illustrates a rechargeable battery system block diagram, according to an example.

FIG. 2 illustrates a rechargeable battery system block diagram 200, according to an example. The rechargeable battery system block diagram 200 is an example of an energy storage system 122 and is able to be utilized as an auxiliary power source placed at any suitable location in an electrical power grid. In general, the rechargeable battery system block diagram 200 depicts a rechargeable battery system with a battery combination that consists of a number of battery sets that are able to operate in conjunction with one another to receive electrical energy from a source, store that electrical energy, and later provide that electrical energy to a consumer of electrical power.

The rechargeable battery system block diagram 200 depicts three battery sets, a battery set A 204, a battery set B 206, and a battery sent N 208. These three battery sets are illustrated as an example and other rechargeable battery systems are able to use any number of battery sets. The one or more batteries, battery sets, other energy storage devices, or combinations of these are generally referred to herein as a battery combination. In general, a battery set is able to consist of one or more batteries and is able to include multiple batteries that are able to be connected so as to operate as a single energy storage device to receive energy to store and then later provide that energy to a load.

Each battery set in the rechargeable battery system block diagram 200 has an associated monitor. Battery set A 204 is associated with a monitor A 214, battery set B 206 is associated with a monitor B 216, and battery set N 208 is associated with a monitor N 218. In general, each of these monitors determines a present remaining battery capacity for its associated battery. In the present discussion, remaining battery capacity reflects degradation of the battery set and the reduction in total energy that is able to be stored in a fully charged battery due to aging and repeated charging and discharge cycling. In an example, remaining battery capacity is expressed as a percentage of the total energy that the fully charged battery set is able to store relative to the specification of a total amount of energy that battery set is specified to store. In an example, this specification reflects the amount of energy the battery set could store when it was new. Examples of a monitor suitable to operate as the monitor A 214, the monitor B 216, or the monitor N 218, is described in commonly owned U.S. patent application Ser. No. 15/095,693, entitled "STEP-TIME BATTERY DEGRADATION DETERMINATION," filed on Apr. 11, 2016, the entire contents and teachings of which are hereby incorporated herein by reference.

Each battery set is connected in series with an associated current control device. Battery set A 204 is connected in series with a current control A 224, battery set B 206 is in series with current control B 226, and battery set N 208 is in series with current control N 228. In general, each of these current control devices is able to be configured to control an amount of electrical current flowing through its associated battery set as well as the direction of that current flow. In an example, each current control device is able be configured to allow electrical current to flow into its associated battery set in order to charge that battery set, or to allow electrical current flow out of the battery set in order to discharge that battery set and provide energy stored in that battery set to be delivered to external systems as is described below.

In various examples, these current control devices, such as current control A 224, current control B 226, or current control C 228, are able to control current flow by any suitable technique. In some examples, these current control devices are able to switch current flow off and on for determined intervals to achieve a total current flow over these determined intervals that correspond to the configured current flow that is to flow through its associated battery set. In some examples, these current control devices are able to set an output current limit that corresponds to the configured current flow for its associated battery set. In general, these current control devices are able to use one or any combination of multiple current flow limiting operations to control the electrical current that flows through its associated battery.

The current control devices are each configured to receive electrical current from, or provide electrical current to, an inverter 230. The inverter 230 is an example of a power grid interface that couples the above described battery combination with an electrical power grid. The inverter 230 is able to be any suitable device that supports exchanging electrical current between the battery sets of the rechargeable battery system block diagram 200 and external power systems such as the illustrated power grid 232. In a further example, the inverter 230 is able to act as a current control device for one or more battery sets. In such examples, one or more battery sets are connected to an inverter without an intervening current control device. Further, in some examples, each battery set is able to be connected to its own inverter.

The rechargeable battery system block diagram 200 includes a total current control 234. The total current control 234 in an example is a source of a specification of a total amount of electrical current that is to be provided by, or that is to be received, by the rechargeable battery system illustrated in the rechargeable battery system block diagram 200. In various examples, the total current control 234 provides a specification of an amount of electrical current that the rechargeable battery system is to provide to the illustrated power grid 232, a specification of an amount of electrical current to be taken from the power grid 232 for use in charging the battery sets of the rechargeable battery system, a specification that the rechargeable battery system is to remain idle and not provide or receive any electrical energy to or from the power grid 232, any other specification, or combinations of these. In general, the total current control 234 is able to be any suitable source of such control signals, such as a communications interface to a remote controlling function, a processor that implements various algorithm or applies other rules to various inputs to determine a total current control specification for the rechargeable battery system, other sources, or combinations of these.

The rechargeable battery system block diagram 200 includes a current division controller 202 that provides control signals to each current control device, such as current control A 224, current control B 226, and current control N 228, to specify the individual amounts of electrical current that are to flow through each associated battery set and also the direction of that electrical current flow.

The current division controller 202 receives information regarding each battery set from the monitor associated with that battery set. For example, the illustrated current division controller 202 receives status characterizations for battery set A 204 from monitor A 214, status characterizations for battery set B 206 from monitor B 216, and status characterizations for battery set N 208 from monitor N 218. These characterizations include but are not limited to, for example, the present state of health or capacity of each of these battery sets which reflects the degradation to each of these battery sets over time due to age and use by charging and recharging. As is described below, the current division controller 202 determines an amount of electrical current that is to flow through each battery set and commands the associated current control device to cause that amount of electrical current to flow through its associated battery set.

Figure 3:
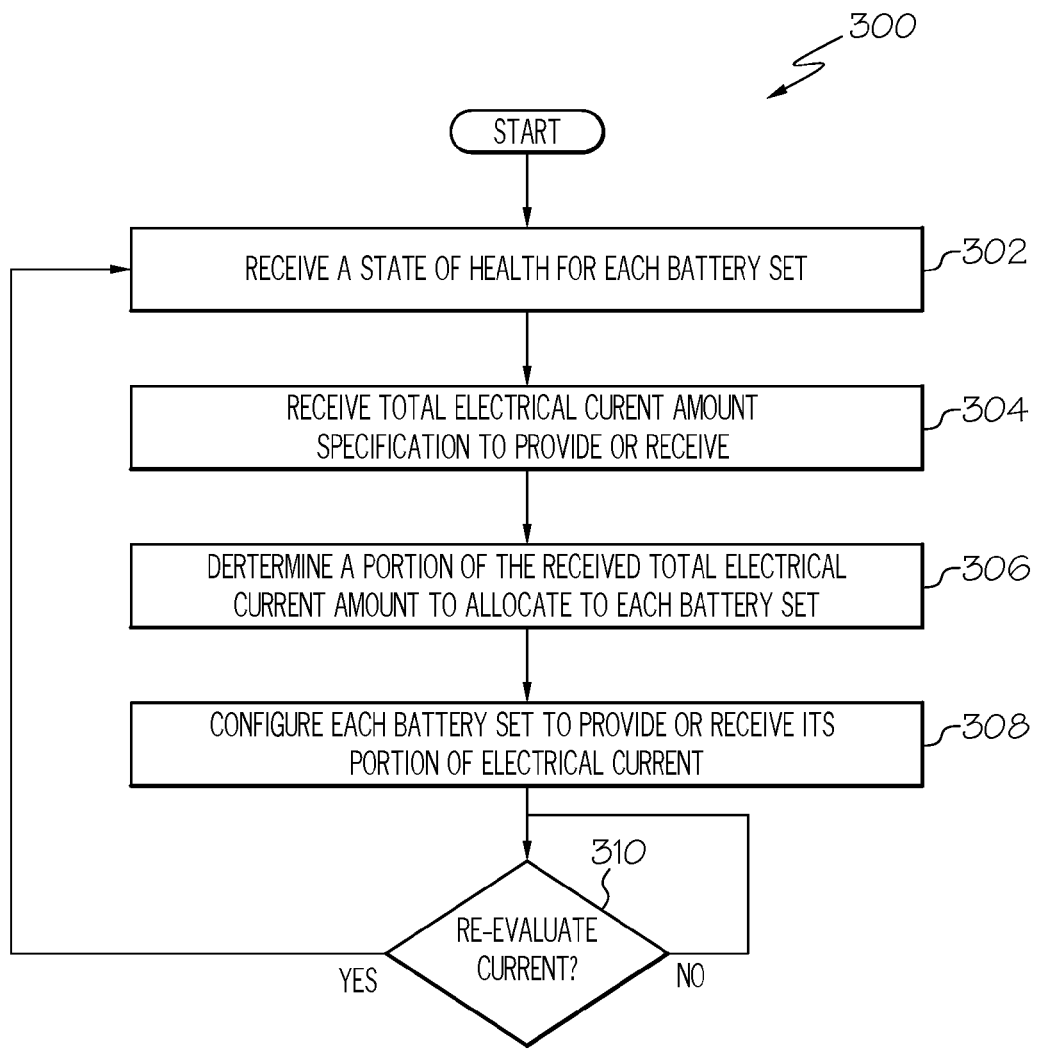
FIG. 3 illustrates a rechargeable battery system control process, according to an example.

FIG. 3 illustrates a rechargeable battery system control process 300, according to an example. This description of the rechargeable battery system control process 300 include references to the rechargeable battery system block diagram 200 described above. The rechargeable battery system control process 300 is an example of a process performed by the current division controller 202 described above. The rechargeable battery system control process 300 in an example configures each battery set in a rechargeable battery system to receive or provide a specified amount of electrical current based on its capacity relative to the capacity of other battery sets in the rechargeable battery system.

The rechargeable battery system control process 300 beings by receiving, at 302, a state of health for each battery set. The state of health in an example is specified as a percentage of the total amount of electrical energy that is able to be stored in a particular battery set relative to the total amount of electrical current specified for that particular battery set, such as the amount of energy it could store when it was new and had not degraded due to time and use. In an example, the state of health of each battery set is received from the monitors described above, such as monitor A 214, monitor B 216, or monitor N 218.

The rechargeable battery system control process 300 receives, at 304, a total of electrical current amount specification that the rechargeable battery system is to provide or receive. In an example this total amount of electrical current is specified by a source or algorithm. The total current control 234 described above is an example of a source from which this specification of the total amount of electrical current is able to be received.

A portion of the received total electrical current amount to allocate to each battery set in the rechargeable battery system is determined, at 306. This allocation is able to be made based upon the state of health of each battery set relative to other battery sets in the rechargeable battery system.

In one example, the allocation of electrical current to each battery set is based on the present state of health or remaining capacity of each battery set relative to the state of health or remaining capacity of the other battery sets. In one example, the state of health of a battery set is specified as a percentage of total energy that the battery set is presently able to store when filly charged as compared to a specification of the amount of energy that battery set can store, such as the amount of energy it could store when that battery set was new. For example, a 1,000 Amp-Hour battery set that has a present state of health or present capacity of 80% will store 800 Amp-Hours when fully charged.

The allocation of electrical current in one example is able to be based on a simple proportion of the present capacity of each patter to a total of all of the present capacity percentages for all of the battery sets. In an example, the electrical current to flow through a battery set A ($I_A$) is given by an equation: $I_A = I_{total} \cdot SOH_A / \Sigma SOH_i$ where $I_{total}$ is the total amount of current to allocate to all battery sets, and $\Sigma SOH_i$ is the sum of the SOH percentages for all battery sets. In this example, the denominator of this equation may be greater than 100.

Each battery set is then configured, at 308, to provide or receive its determined portion of the total electrical current to be provided or received by the rechargeable battery system. In an example, configuring a particular battery set to provide this portion of electrical current is perform by sending control signals to the current control device that is in series with that particular battery set. For example, setting the amount of electrical current to be provided or received by battery set A 204 is performed by controlling current control A 224 to cause that portion of electrical current to flow through battery set A 204.

A determination is made, at 310, if the electrical current settings for the battery sets are to be re-evaluated. This re-evaluation is able to be based on, for example, receiving a new total electrical current amount command, receiving a new estimate of state of health or capacity for one or more battery sets, based on a configured time interval for re-evaluation of these parameters, based on any other event, or based on combinations of these. If this determination repeats until it is determined that this re-evaluation is to be performed. Once this re-evaluation is determined to be performed, the state of health of each battery set is determined, at 302, and the above described processing is repeated.

Figure 4:
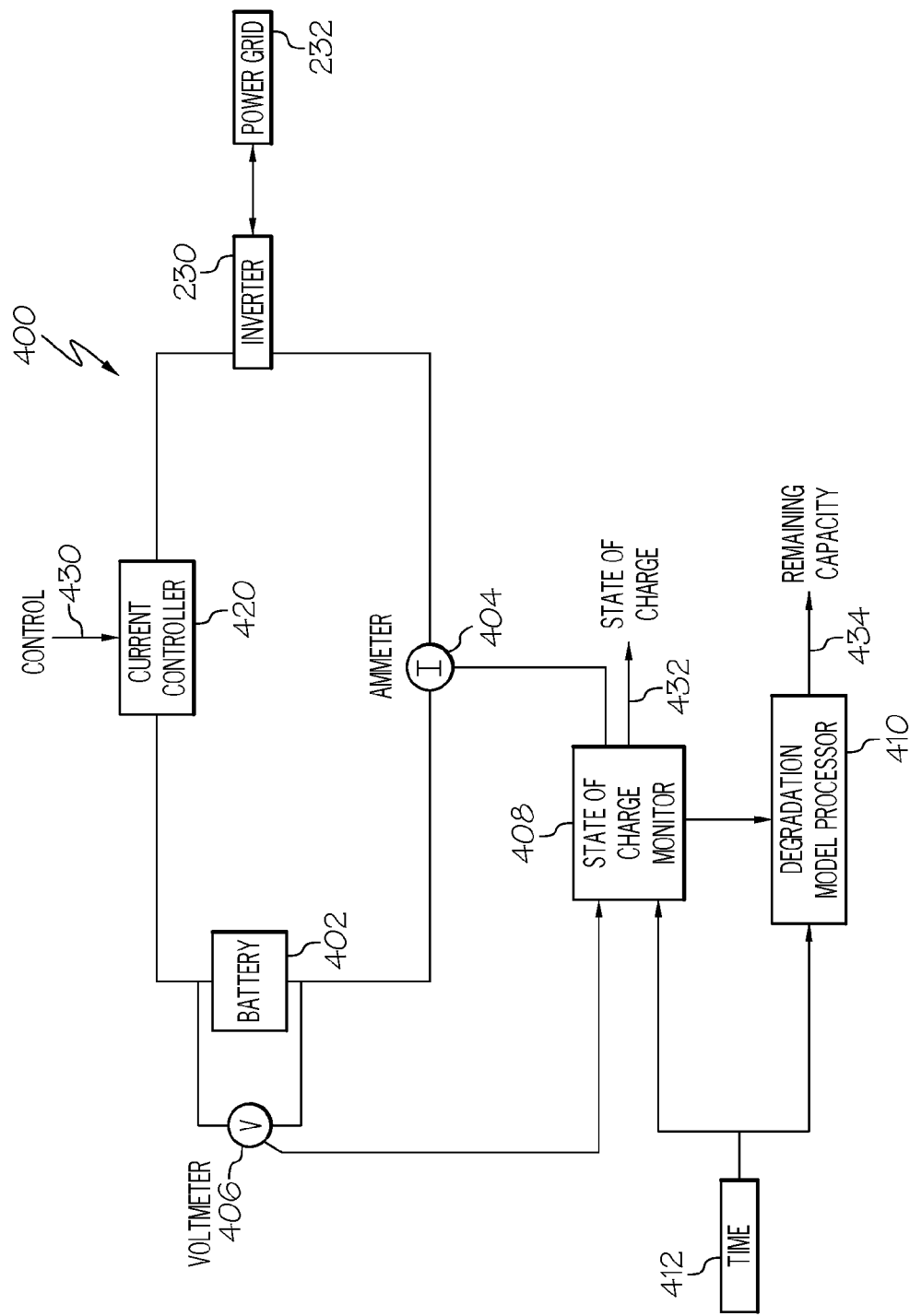
FIG. 4 depicts an energy storage battery subsystem according, to one example.

FIG. 4 depicts an energy storage battery subsystem 400 according to one example. The energy storage battery subsystem 400 depicts a configuration of a single battery set, such as battery set A 204, in conjunction with an inverter 230 and its connection to the power grid 232. The battery 402 in this example is able to be a single battery or a combination of several batteries connected to so as to operate and be treated as a single battery. In an example, the battery 402 is equivalent to one battery set such as those described above.

The battery 402 is connected to the inverter 230 through a current controller 420 as is described above with regards to, for example, battery set A 204 and current control A 224. The inverter 230, as described above, exchanges energy between the battery 402 and the power grid 232. The power grid 232 in this example is an example of an external power system. The battery 402 in this example is able to periodically provide electric power through the inverter 230 to the power grid 232, or to a particular load or premises on the grid in further examples, based upon a number of factors including demand and load management factors. The current controller 420 in an example receives a control 430 specifying the direction and amount of electrical current that is to flow through the battery 402, and thus controls the charging and discharging cycles of the battery 402.

The energy storage battery subsystem 400 includes a state of charge (SOC) monitor 408 that operates to monitor the operation of the battery 402 and determine an estimate of the amount of charge in the battery, which corresponds to the energy remaining in the battery, at a given time. The state of charge monitor 408 provides the present state of charge output 432 to any suitable destination.

The battery 402 in this example is connected in a parallel configuration with a voltmeter 406. Voltmeter 406 measures and reports output voltages of the battery 402. The voltmeter 406 is able to measure the instantaneous voltage across the battery 402. The voltmeter 406 in this example reports the instantaneous output voltage of the battery to the state of charge monitor 408. The battery 402 and voltmeter 406 in some examples are able to be connected in a substantially parallel configuration and with either direct or indirect couplings. Indirect connections are able to include, as an example, resistive components, reactive components, active components, or combinations of these.

The battery 402 is further connected in series with an ammeter 404. The ammeter 404 in an example continuously monitors the electrical current passing through the battery 402 and reports these readings to the state of charge monitor 408. The battery 402 and ammeter 404 in one example may be in a substantially series configuration such that all or nearly all of the current that passes through one component passing through the other.

The state of charge monitor 408 in one example is a dedicated processor or a computing process within a general purpose processor that receives, assembles and processes battery status data to determine or estimate the present state of charge of the battery 402. In an example, the state of charge monitor estimates the state of charge present in the battery is determined based on the battery output voltage measurements received from the voltmeter 406 and the electrical current measurements received from ammeter 404. In an example, electrical current drawn from or provided to the battery 402 is integrated and this integrated value is used as a basis for determining the state of charge of the battery 402.

In an example, the state of charge monitor 408 is also able to determine the charging state of the battery 402. The charging state of the battery 402 in an example is able to be one of that the battery is in a state of being charged, being discharged, or the battery is idle without appreciable current flowing therethrough. In an example, the charging state of the battery is able to be determined by the present direction of current flow through the battery 402, where current into the battery indicates that the battery is being charge, current being drawn from the battery indicates that the battery is being discharged, and substantially no current through the battery indicated that the battery is idle.

As described above, the maximum amount of energy that a battery is able to store when the battery is fully charged is referred to as the battery's present capacity and decreases with usage and time. The state of health of a battery refers to the amount of degradation in the amount of total energy that a battery is able to store, i.e., a reduction in the battery capacity. The percentage of degradation is referred to a battery's "state of health." A degradation model processor 410 is an example of a state of health processor that determines the present state of health of the battery 402. The degradation model processor 410 is an example of a state of health (SOH) processor that is able to determine the state of health (SOH), which is equivalent to the present capacity, of the battery 402. The degradation model processor 410 in various examples is able to use any technique to determine or estimate the present state of health, or remaining capacity, of the battery 402. In an example, the state of charge monitor 408 provides both an indication the charging state of the battery 402 and the estimated present state of charge of the battery 402 to support a determination of the present state of health of the battery 402. The degradation model processor 410 monitors the operation of the battery 402 as measured by the voltmeter 406 and ammeter 404 over time and applies a degradation model using these measurements to determine the present remaining capacity of the battery 402.

The state of charge monitor 408 and degradation model processor 410 both monitor, accumulate and process measured values and determined values and conditions over various time durations. The degradation model processor 410 in an example determines the remaining capacity of the battery 402 based on observed charging states and electrical current flowing through the battery 402 over time. The energy storage battery subsystem 400 includes a time source 412 to provide this time to these components to support their operation. An example of a degradation model processor 410 is described in commonly owned U.S. patent application Ser. No. 15/095,693, entitled "STEP-TIME BATTERY DEGRADATION DETERMINATION" filed on Apr. 11, 2016, the entire contents and teachings of which are hereby incorporated herein by reference.

Figure 5:
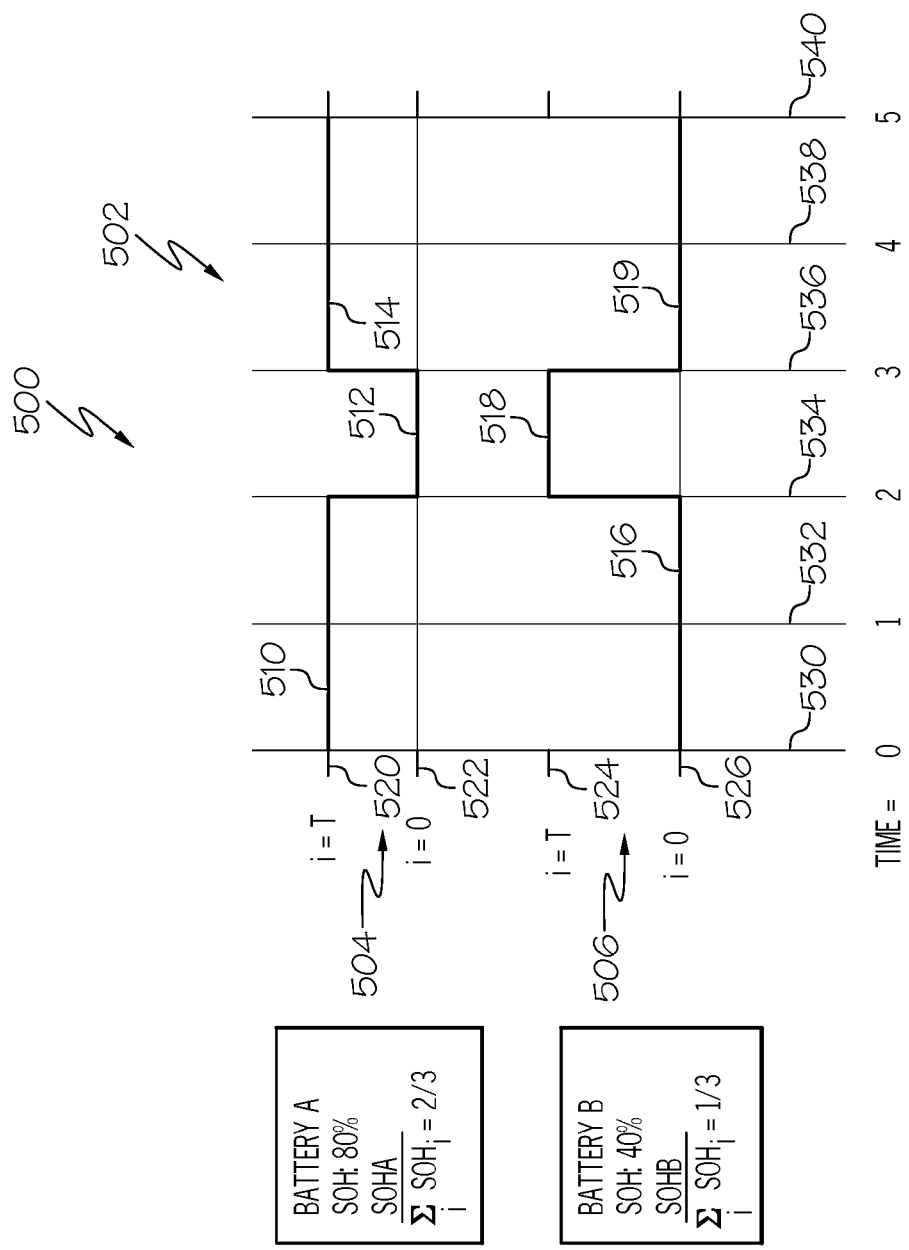
FIG. 5 illustrates an electrical current division operation, according to an example.

FIG. 5 illustrates an electrical current division operation 500, according to an example. The electrical current division operation 500 illustrates how a total amount of electrical current is divided between two batteries according to the relative capacity or state of health of each battery compared to the other. This description refers to two batteries to simplify the description and presentation of the certain aspects. In general, these principles are able to be directly applied to any rechargeable battery system with any number of any suitable type of batteries including single batteries or battery sets consisting of multiple batteries.

The electrical current division operation 500 depicts how a total electrical current amount is divided between two batteries, a battery A and a battery B. In this example, battery A is estimated to have a State Of Health (SOH) of 80%. The SOH of 80% indicates that when battery A is fully charged, it stores only 80% of the total amount of energy that it could store when it was fully charged when it was new. Battery B in this example is estimated to have an SOH of 50%.

In this example, the allocation of electrical current between the two batteries is based on the ratio of the present capacity of each battery to the total of the present capacity of both of these batteries. Given the above described capacities of battery A and battery B being 80% and 50%, respectively, the total of these capacities is 220. Using the allocation technique described above with regards to energy storage battery subsystem 400, battery A has an allocation of 80/120 or ⅔ times the total electrical current for the rechargeable battery system. Battery B has an allocation of 50/120, or ⅓ times the total electrical current for the rechargeable battery system. It is clear that this proportion is able to be calculated in further examples using any number of batteries.

Any operation of a respective current controller for battery A and battery B can be used to cause these amounts of electrical current to pass through these batteries. An electrical current flow diagram 502 depicts the operation of an "on-off" current controller for each of battery A and battery B in this example. In the illustrated example, the rechargeable battery system is to provide an electrical current T to an inverter and out to power consumers. This total electrical current amount T is allocated between battery A and battery B according to the relative capacities of these batteries as is described below. This illustrated example is provided as one example of a technique to allocate electrical current between two batteries. In general, any other suitable technique is able to be used.

The horizontal axis of the electrical current flow diagram 502 depicts a time scale with time marks indicating uniform time intervals. Time interval 0 530 depicts time 0, time interval 1 532 depicts time 1, time interval 2 534 depicts time 2, time interval 3 536 depicts time 3, time interval 4 538 depicts time 4, and time interval 5 540 depicts time 5. The vertical axis indicates electrical current being provided by each battery. Current flow for battery A is shown to vary between an off level 522, where i=0, and an on level 520, where i=T. Electrical current flow for battery B is also shown to vary between an off level 526, where i=0, and an on level 524, where i=T.

The electrical current flow diagram 502 depicts a battery A current flow vs time 504 and a battery B current flow vs. time 506. In this example, each of battery A and battery B are configured to alternately have the total amount of electrical current that is specified to flow through the rechargeable battery system. The time intervals that each battery provides this current is varied to allocate the average amount of current flowing through each battery according to the determined allocation.

The battery A current flow vs time 504 indicates that battery A provides, during a first phase 510, the total amount of current (T) for two time intervals, i.e., from time 0 530 to time 2 534. Battery A provides no current during a second phase 512 between time 2 534 and time 3 536. Battery A then continues to provide current T during a third phase 514 for two time intervals between time 3 536 and time 5 540.

The battery B current flow vs time 506 indicates that battery B provides no electrical current for two time intervals, from time 0 530 to time 2 534, during a first phase 516. Battery B provides current T for one time interval during a second phase 518 between time 2 534 and time 3 536. Battery B then provides no current during a third phase 519 for two time intervals between time 3 536 and time 5 540.

Figure 6:
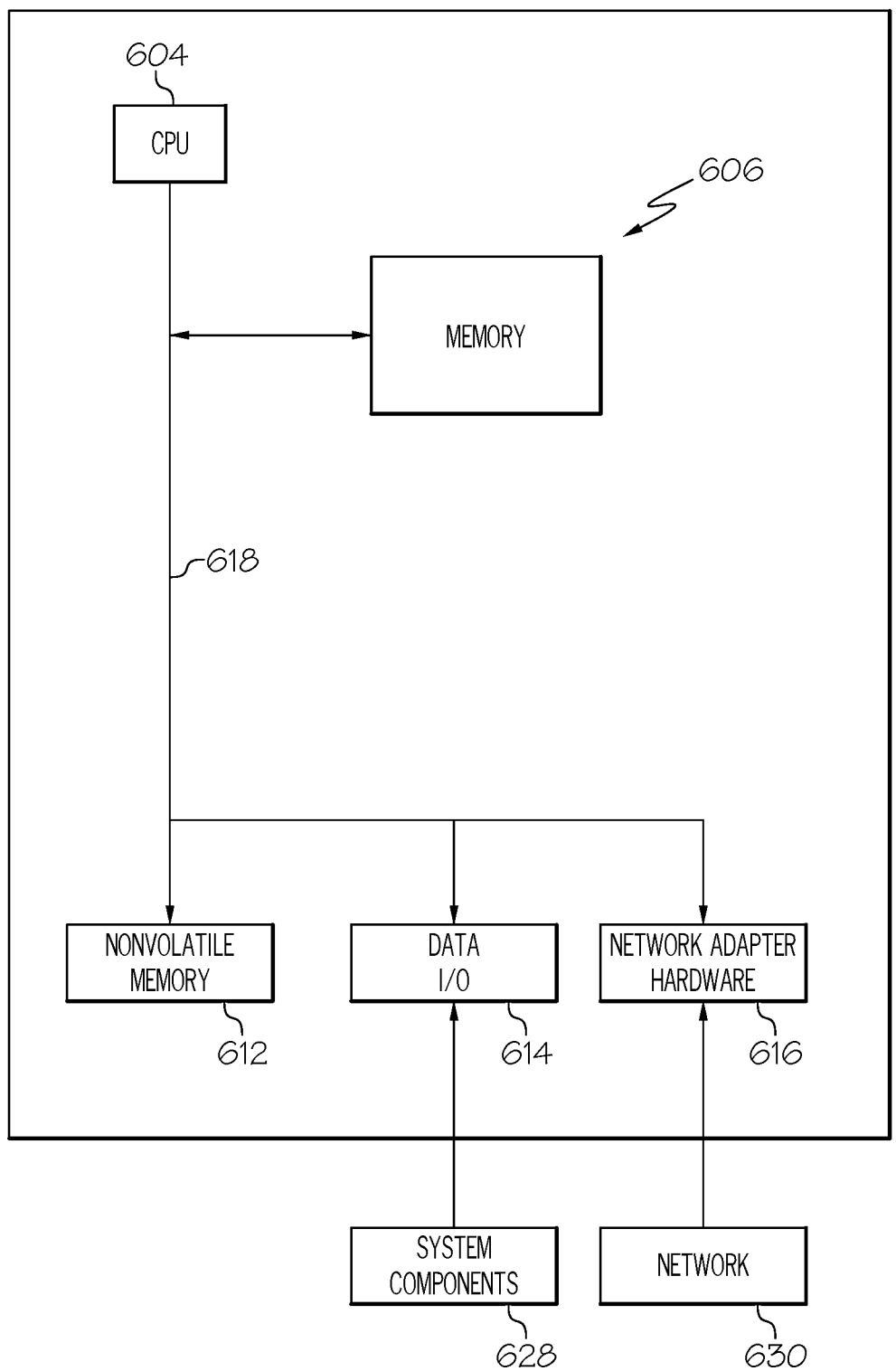
FIG. 6 illustrates a block diagram illustrating a controller, according to an example.

FIG. 6 illustrates a block diagram illustrating a controller 600 according to an example. The controller 600 is an example of a processing subsystem that is able to perform any of the above described processing operations, control operations, other operations, or combinations of these.

The controller 600 in this example includes a CPU 604 that is communicatively connected to a main memory 606 (e.g., volatile memory), a non-volatile memory 612 to support processing operations. The CPU is further communicatively coupled to a network adapter hardware 616 to support input and output communications with external computing systems such as through the illustrated network 630.

The controller 600 further includes a data input/output (I/O) processor 614 that is able to be adapted to communicate with any type of equipment, such as the illustrated system components 628. The data input/output (I/O) processor in various examples is able to be configured to support any type of data communications connections including present day analog and/or digital techniques or via a future communications mechanism. A system bus 618 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for allocating electrical current among battery sets connected in a substantially parallel configuration, the method comprising:
    receiving a respective state of health for each respective battery set in a plurality of battery sets, the respective state of health reflecting a respective present amount of total energy able to be stored by each respective battery set relative to a specification of the respective battery set, wherein determining the respective state of health for each respective battery set is based upon a combination of a number of charging and discharging cycles of each respective battery set and an age of each respective battery set;
    determining, based on the respective state of health for each respective battery set, a respective allocation of electrical current for each battery set in the plurality of battery sets; and
    configuring, based on determining the respective allocation, an electrical current flow through each respective battery set to its respective allocation of electrical current.

2. The method of claim 1, further comprising exchanging the electrical current with an electrical power grid, and
    wherein the plurality of battery sets comprise at least one repurposed battery,
        each at least one repurposed battery having been used in an application different from exchanging electrical current with an electrical power grid.

3. The method of claim 2, wherein the plurality of battery sets is part of a battery combination, the battery combination comprising at least:
    a first battery set having a first state of health when the battery combination is assembled; and
    a second battery having a second state of health when the battery combination is assembled, the second state of health being different than the first state of health.

4. The method of claim 2, wherein the application comprises providing electrical energy for an electrically powered vehicle.

5. The method of claim 1, further comprising receiving a specification of least one of:
    a total amount of electrical current to receive from an external power system for charging the plurality of battery sets, or a total amount of electrical current to provide to the external power system, and wherein the respective allocation of electrical current for each battery set is a respective percentage of the total amount of electrical current.

6. The method of claim 1, further comprising:

coupling the plurality of battery sets to an external power grid through an inverter; and exchanging, based on the respective allocation, electrical power between the external power grid and each battery set in the plurality of battery sets.

7. A method for allocating electrical current among battery sets connected in a substantially parallel configuration, the method comprising:

receiving a respective state of health for each respective battery set in a plurality of battery sets, the respective state of health reflecting a respective present amount of total energy able to be stored by each respective battery set relative to a specification of the respective battery set;

determining, based on the respective state of health for each respective battery set, a respective allocation of electrical current for each battery set in the plurality of battery sets;

coupling the plurality of battery sets to an external power grid through an inverter;

configuring, based on determining the respective allocation, an electrical current flow through each respective battery set to its respective allocation of electrical current; and exchanging, based on the respective allocation, electrical power between the external power grid and each battery set in the plurality of battery sets.

8. The method of claim 7, wherein the plurality of battery sets comprises:

a first battery set having a first state of health when the plurality of battery sets is assembled; and a second battery having a second state of health when the plurality of battery sets is assembled, the second state of health being different than the first state of health.

9. The method of claim 7, wherein the plurality of battery sets comprises at least one repurposed battery that had been used in an application comprising providing electrical energy for an electrically powered vehicle.

10. The method of claim 7, wherein determining the respective state of health for each respective battery set is based upon a number of charging and discharging cycles of each respective battery set.

11. The method of claim 7, wherein determining the respective state of health for each respective battery set is based upon a combination of a number of charging and discharging cycles of each respective battery set and an age of each respective battery set.

12. The method of claim 7, further comprises receiving a specification of at least one of:

a total amount of electrical current to receive from an external power system for charging the plurality of battery sets, or a total amount of electrical current to provide to the external power system, and wherein the respective allocation of electrical current for each battery set is a respective percentage of the total amount of electrical current.

13. An apparatus for controlling electrical current allocated to a plurality of battery sets, the apparatus comprising:

a battery combination comprising at least one repurposed battery;

a current division controller that, when operating:

receives a respective state of health for each respective battery set in a plurality of battery sets, the respective state of health reflecting a respective present amount of total energy able to be stored by each respective battery set relative to a specification of the respective battery set;

determines, based on the respective state of health for each respective battery set, a respective allocation of electrical current for each battery set in the plurality of battery sets; and configures, based on a determination of the respective allocation, a respective electrical current flow through each respective battery set to its respective allocation of electrical current; and a power grid interface coupling the battery combination with an electrical power grid, wherein each at least one repurposed battery had been used in an application different from exchanging electrical current with an electrical power grid.

14. The apparatus of claim 13, wherein the battery combination comprises:

a first battery set having a first state of health when the battery combination is assembled; and a second battery having a second state of health when the battery combination is assembled, the second state of health being different than the first state of health.

15. The apparatus of claim 13, wherein the application comprises providing electrical energy for an electrically powered vehicle.

16. The apparatus of claim 13, further comprising a state of health processor that, when operating, determines the respective state of health for each respective battery set based upon a number of charging and discharging cycles of each respective battery set.

17. The apparatus of claim 13, further comprising a state of health processor that, when operating, determines the respective state of health for each respective battery set based upon a combination of a number of charging and discharging cycles of each respective battery set and an age of each respective battery set.

18. The apparatus of claim 13, wherein the current division controller, when operating, further receives a specification of:

at least one of:

a total amount of electrical current to receive from an external power system for charging the plurality of battery sets, or a total amount of electrical current to provide to the external power system, and wherein the respective allocation of electrical current for each battery set is a respective percentage of the total amount of electrical current.

19. An apparatus for controlling electrical current allocated to a plurality of battery sets, the apparatus comprising:

a current division controller that, when operating:

receives a respective state of health for each respective battery set in a plurality of battery sets, the respective state of health reflecting a respective present amount of total energy able to be stored by each respective battery set relative to a specification of the respective battery set;

determines, based on the respective state of health for each respective battery set, a respective allocation of electrical current for each battery set in the plurality of battery sets; and configures, based on a determination of the respective allocation, a respective electrical current flow through each respective battery set to its respective allocation of electrical current; and an inverter coupling the plurality of battery sets to an external power grid, wherein the inverter, when operating, exchanges, based on the respective allocation, electrical power between the external power grid and each battery set in the plurality of battery sets.

20. The apparatus of claim 19, wherein the plurality of batter sets comprises:

a first battery set having a first state of health when the plurality of battery sets is assembled; and a second battery having a second state of health when the plurality of battery sets is assembled, the second state of health being different than the first state of health.

21. The apparatus of claim 19, wherein the plurality of battery sets comprises at least one repurposed battery that had been used in an application comprising providing electrical energy for an electrically powered vehicle.

22. The apparatus of claim 19, further comprising a state of health processor that, when operating, determines the respective state of health for each respective battery set based upon a number of charging and discharging cycles of each respective battery set.

23. The apparatus of claim 19, further comprising a state of health processor that, when operating, determines the respective state of health for each respective battery set based upon a combination of a number of charging and discharging cycles of each respective battery set and an age of each respective battery set.

24. The apparatus of claim 19, wherein the current division controller, when operating, further receives a specification of at least one of:

a total amount of electrical current to receive from an external power system for charging the plurality of battery sets, or a total amount of electrical current to provide to the external power system, and wherein the respective allocation of electrical current for each battery set is a respective percentage of the total amount of electrical current.

25. A computer program product for controlling electrical current allocated to a plurality of battery sets, the computer program product comprising:

a non-transitory computer readable medium having computer readable program code embodied therewith, the computer readable program code comprising instructions for:

receiving a respective state of health for each respective battery set in a plurality of battery sets, the respective state of health reflecting a respective present amount of total energy able to be stored by each respective battery set relative to a specification of the respective battery set;

wherein the plurality of battery sets exchange electrical power with an electrical power grid, and wherein the plurality of battery sets comprise at least one repurposed battery, each at least one repurposed battery having been used in an application different from exchanging electrical current with an electrical power grid;

determining, based on the respective state of health for each respective battery set, a respective allocation of electrical current for each battery set in the plurality of battery sets; and configuring, based on determining the respective allocation, a current flow through each respective battery set to its respective allocation of electrical current.

26. The computer program product of claim 25, wherein the plurality of battery sets are part of an battery combination, the battery combination comprising at least:

a first battery set having a first state of health when the battery combination is assembled; and a second battery having a second state of health when the battery combination is assembled, the second state of health being different than the first state of health.

27. The computer program product of claim 25, wherein the application comprises providing electrical energy for an electrically powered vehicle.

28. The computer program product of claim 25, wherein the computer readable program code further comprising instructions for receiving a specification of:

at least one of:

a total amount of electrical current to receive from an external power system for charging the plurality of battery sets, or a total amount of electrical current to provide to the external power system, and wherein the respective allocation of electrical current for each battery set is a respective percentage of the total amount of electrical current.

29. The computer program product of claim 25, further comprising a state of health processor that, when operating, determines the respective state of health for each respective battery set based upon a number of charging and discharging cycles of each respective battery set.

30. The computer program product of claim 25, further comprising a state of health processor that, when operating, determines the respective state of health for each respective battery set based upon a combination of a number of charging and discharging cycles of each respective battery set and an age of each respective battery set.

31. A computer program product for controlling electrical current allocated to a plurality of battery sets, the computer program product comprising:

a non-transitory computer readable medium having computer readable program code embodied therewith, the computer readable program code comprising instructions for:

receiving a respective state of health for each respective battery set in a plurality of battery sets, the respective state of health reflecting a respective present amount of total energy able to be stored by each respective battery set relative to a specification of the respective battery set;

determining, based on the respective state of health for each respective battery set, a respective allocation of electrical current for each battery set in the plurality of battery sets;

coupling the plurality of battery sets to an external power grid through an inverter;

configuring, based on determining the respective allocation, an electrical current flow through each respective battery set to its respective allocation of electrical current; and exchanging, based on the respective allocation, electrical power between the external power grid and each battery set in the plurality of battery sets.

32. The computer program product of claim 31, wherein the plurality of battery sets comprises:

a first battery set having a first state of health when the plurality of battery sets is assembled; and a second battery having a second state of health when the plurality of battery sets is assembled, the second state of health being different than the first state of health.

33. The computer program product of claim 31, wherein the plurality of battery sets comprises at least one repurposed battery that had been used in an application comprising providing electrical energy for an electrically powered vehicle.

34. The computer program product of claim 31, wherein determining the respective state of health for each respective battery set is based upon a number of charging and discharging cycles of each respective battery set.

35. The computer program product of claim 31, wherein determining the respective state of health for each respective battery set is based upon a combination of a number of charging and discharging cycles of each respective battery set and an age of each respective battery set.

36. The computer program product of claim 31, wherein the computer readable program code further comprises instructions for receiving a specification of at least one of:
  a total amount of electrical current to receive from an external power system for charging the plurality of battery sets, or
  a total amount of electrical current to provide to the external power system, and
  wherein the respective allocation of electrical current for each battery set is a respective percentage of the total amount of electrical current.

* * * * *